Aug. 16, 1927.  1,639,256
A. CHRISTIANSON ET AL
BRAKE HEAD SUPPORT
Filed Jan. 14, 1926  2 Sheets-Sheet 1
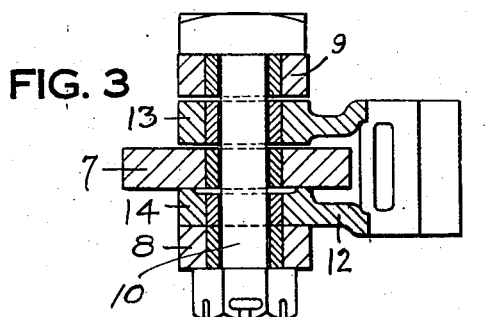
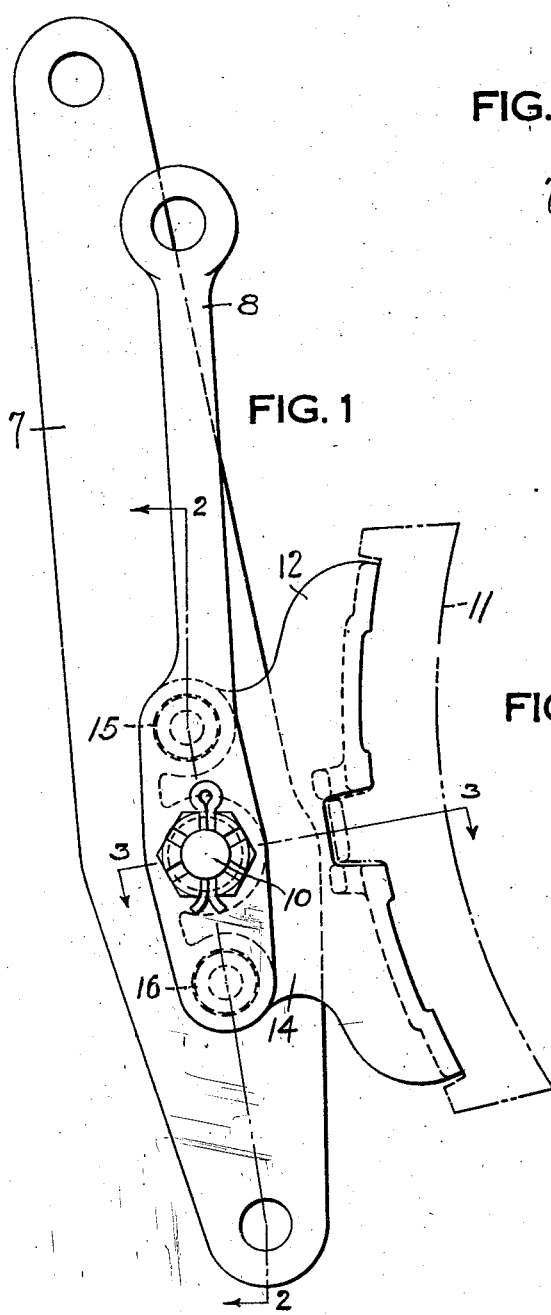
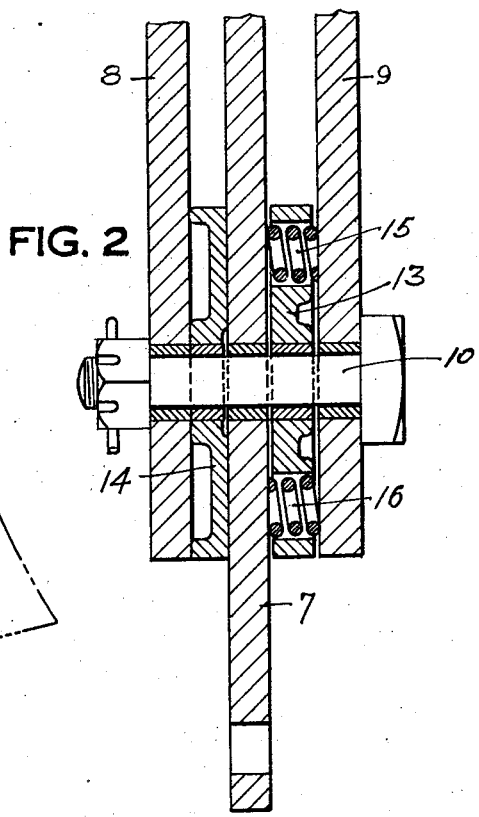
INVENTOR
Arnold Christianson
& Christian Christianson
By Archworth Martin
Attorney Aug. 16, 1927.

A. CHRISTIANSON ET AL 1,639,256

BRAKE HEAD SUPPORT

Filed Jan. 14, 1926     2 Sheets-Sheet 2

INVENTOR.
Arnold Christianson
f Christian Christianson
By Archworth Martin,
Attorney.

Patented Aug. 16, 1927.

1,639,256

UNITED STATES PATENT OFFICE.

ARNOLD CHRISTIANSON AND CHRISTIAN CHRISTIANSON, OF HAMMOND, INDIANA.

BRAKE-HEAD SUPPORT.

Application filed January 14, 1926. Serial No. 81,194.

Our invention relates to brake head supports for use in connection with railway car brakes and the like, and particularly to means for supporting said brake heads.

One object of our invention is to provide means for maintaining brake heads under tension with respect to the supporting hangers therefor, to enable them to automatically adjust themselves to the wearing face of the car wheels, and to prevent rattling in their supports.

Another object of our invention is to simplify and improve generally the structure and operation of brake heads and their supports.

Figure 4:
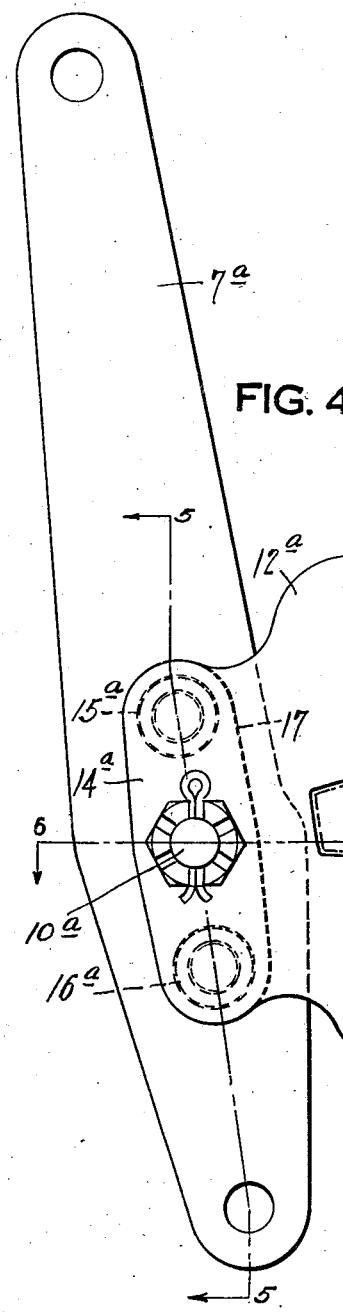
Figure 6:
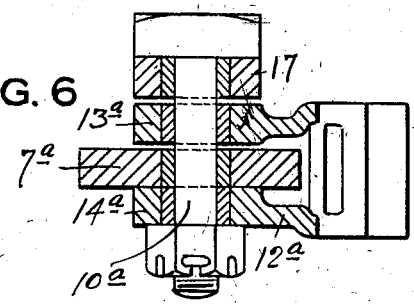
Figure 5:
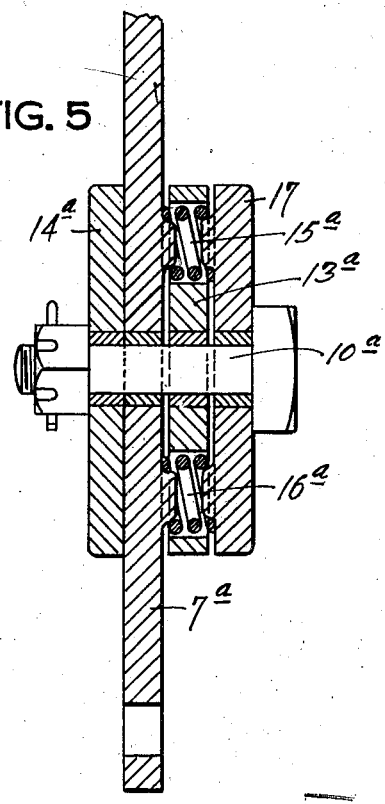

Some of the forms which our invention may take are shown in the accompanying drawing, wherein Fig. 1 is a side elevational view of a portion of a brake rigging embodying our invention; Fig. 2 is a view on the line 2—2 of Fig. 1; Fig. 3 is a view taken on the line 3—3 of Fig. 1; Fig. 4 is a side elevational view of a modified form of brake head support; Fig. 5 is a view taken on the line 5—5 of Fig. 4, and Fig. 6 is a view taken on the line 6—6 of Fig. 4.

Only so much of a brake rigging as is necessary to an explanation of our invention is shown in the drawing. In Fig. 1 we show a brake lever 7 that may be of the usual form and provided at its upper end with openings whereby it may be connected to brake rigging (not shown) in the usual manner. Brake hangers 8 and 9 for supporting the brake head and brake lever are provided with bolt holes at their upper ends for connection to a truck bolster (not shown), or other portions of the car structure.

A pivot bolt 10 extends through openings in the hangers 8 and 9 and the brake lever 7 in the manner shown in Fig. 2. A brake shoe 11 is supported by the brake head 12 in any suitable manner. The brake head 12 is provided with a pair of arms or wing portions 13 and 14 that are perforated for the reception of the bolt 10 which holds the brake hangers and brake head in assembled relation and permits relative pivotal movement thereof.

The lower end of the hanger 9 is widened to provide bearing surfaces of sufficient lateral width for compression springs 15 and 16 that extend through perforations in the wing 13 of the brake head. The perforations are of sufficient size to provide clearance that will permit pivotal movement of the hanger 9 and lever 7 about the bolt 10. The springs 15 and 16 are compressed between the hanger 9 and the brake lever 7 and hold the lever in frictional engagement with the wing 14 of the brake head.

It will thus be seen that the brake head will be frictionally adjustable about the pivot 10 when the brakes are applied, so that the wearing surface of the shoe 11 may be brought into full contact with the tread of a car wheel. As the shoe wears down further adjustable movement of the brake head about the pivot bolt 10 will take place, to compensate for differences in the curvature of the wearing faces of the brake shoe and tread of the car wheel with respect to the arc of travel of the pivot bolt 10 when the brake is applied. The springs also prevent chattering or rattling of the brake head and of the brake lever with respect to the hangers, particularly when the brakes are in release position.

While the art shows it to be old to place spring tensioned devices about the pivot bolts of brake heads, we secure various advantages by our arrangement. For instance, the springs may be applied without increasing the lateral dimensions of the brake head, or the overall width of the apparatus, such as would be necessary if a coil spring were placed between the bolt head or the nut and the brake hanger. Furthermore, the brake head is more firmly held in its various adjusted positions, with a minimum amount of spring capacity than in the case of those structures wherein a spring is applied at the pivotal connection between the brake head and its associated parts. Also, the springs are partially housed by the walls of the perforations in the hanger.

Referring to Figs. 4, 5 and 6, we show a manner in which our invention may be applied to those structures wherein the brake lever serves also as a brake hanger. In this type a brake head 12$^a$ is provided with wing portions 13$^a$ and 14$^a$ that are formed similarly to the wings 13 and 14 of Figs. 1 to 3. A spring-seating plate 17 is provided and a pivot bolt 10$^a$ extends through perforations in the plate 17, brake head members 13$^a$ and 14$^a$ and the combined brake lever and hanger 7$^a$. Compression springs 15$^a$ and 16$^a$ are interposed between the plate 17 and the brake hanger 7ª, the members 7ª and 17 being provided with bosses around which the ends of the spring seat, such bosses serving to prevent displacement of the springs relative to the members 7ª and 17. The perforations in the wing 13ª have sufficient clearance to permit movement of the springs about the bolt 10ª as an axis.

The springs serve to maintain the contacting faces of the lever 7ª and the wing 14ª in frictional contact so that the brake head 12ª is permitted to have movement about the pivot bolt 10ª, as does the brake head 12 of Fig. 1.

We claim as our invention:

1. The combination with a brake lever and a brake head having a pair of axially spaced wings, of a pivot bolt extending through said lever and said wings, a holding plate supported by said bolt in axially spaced relation to the lever and one wing member, and a spring interposed between said holding plate and said lever for holding the lever in frictional engagement with one of said wings.

2. The combination with a brake lever and a brake head having a pair of axially spaced wings, of a pivot bolt extending through said lever and said wings, a holding plate supported by said bolt in axially spaced relation to the lever and one wing member, and a spring extending through one of said wings and interposed between the said plate and lever for holding the lever in frictional engagement with the other one of said wings.

3. The combination with a brake lever and a brake head having a pair of axially spaced wings, of a pivot bolt extending through said lever and said wings, a holding plate supported by said bolt in axially spaced relation to the lever and one wing member, and a pair of springs extending through one of said wings at points above and below the pivot bolt and pressed between said plate and said lever to hold the lever in frictional engagement with the other wing.

4. The combination with a supporting member and a slotted brake head pivotally connected thereto, the supporting member being disposed within said slot, of a spring extending through one wall of said slot in position to bear against said supporting member to hold it in frictional engagement with another wall of said slot.

5. The combination with a brake head having a wing portion, of a hanger-like member pivotally connected to said head, a spring seating plate, and a spring interposed between said plate and said hanger member for holding the hanger in frictional engagement with said wing portion.

6. The combination with a brake head having a perforated wing portion, of a hanger-like member pivotally connected to said head, a spring seating plate, and a spring extending through said perforation and seated between the said plate and said hanger, for holding said hanger in frictional engagement with the brake head.

7. The combination with a supporting member and a brake head member, of a pivotal connection between said head and the supporting member, at a point intermediate the ends of the head, one of said members being slotted and the other member lying within the slot, to form an overlapping arrangement, a spring extending through one of the overlapping portions with one of its ends bearing against another of said portions, and means for supporting the opposite end of the spring against movement in one direction, the spring being spaced radially from the point of pivotal connection.

In testimony whereof we the said ARNOLD CHRISTIANSON, and CHRISTIAN CHRISTIANSON have hereunto set our hands.

ARNOLD CHRISTIANSON.
CHRISTIAN CHRISTIANSON.